United States Patent Office 3,219,847
Patented Nov. 23, 1965

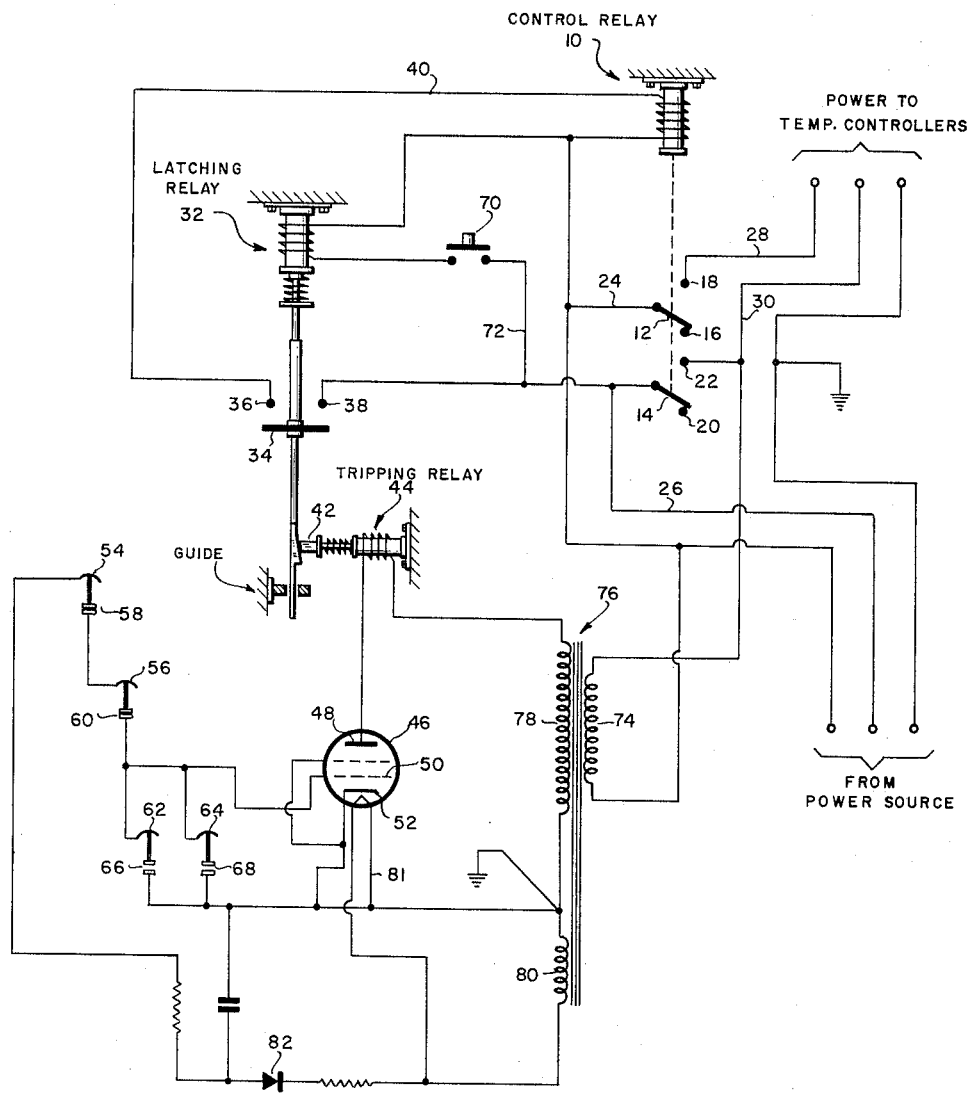

3,219,847
AUTOMATIC LIMIT CONTROL APPARATUS
Walter A. Morgan, Baytown, Tex., assignor, by mesne assignments, to Esso Research and Engineering Company, Elizabeth, N.J., a corporation of Delaware
Filed Sept. 26, 1962, Ser. No. 226,289
3 Claims. (Cl. 307—116)

This invention relates to automatic limit control apparatus. More particularly, this invention relates to apparatus for continuously monitoring one or more operating parameters in a system.

In certain operations as, for example, chemical or other operations in which various parameters such as temperature, pressure, and flow are involved, it is often necessary that the parameter be limited to a predetermined value. Hence, means must be provided for automatically stopping the flow of current to a process, such as a temperature controller, if the temperature within the process should go beyond the predetermined limit.

In operations of long duration which at times must be left unattended, it is also highly desirable that means be provided for automatically permitting the system to be immediately de-energized in the event of a line power failure, then again energized when the power through the line is resumed.

The invention to be described herein is an automatic limit control apparatus which consists of a small number of parts and is relatively inexpensive. The invention to be described herein automatically shuts off the flow of power to a process if the parameter to be controlled within the process goes beyond a predetermined value. Also, the system to be described herein automatically permits the resumption of the feeding of power to the process in the event of a power failure.

The invention, as well as its many advantages, will be further understood by reference to the following detailed description and single drawing which is an electrical diagrammatic view showing a preferred embodiment of the invention.

Referring to the drawing, a system is shown for controlling the electrical power suplied to temperature controllers such as may be used in controlling the temperature within a process. The automatic apparatus includes a control relay 10 having switch contacts 12 and 14. Switch 12 is adapted to contact either switch contact 16 or switch contact 18. Switch 14 is adapted to contact switch contact 20 or switch contact 22. When the relay 10 is operated to connect switch 12 to switch contact 18 and switch 14 to switch contact 22, respectively, current can be fed from the power source through lines 24 and 26 to lines 28 and 30, respectively. Lines 28 and 30 lead to the temperature controllers.

A latching relay 32 is provided in the circuit. The latching relay 32 includes a switch 34 adapted to engage switch contacts 36 and 38. Switch contacts 36 and 38 are in the line 40 leading to the control relay 10. The latching relay 32 is shown diagrammatically as having incorporated therewith a latch 42 for maintaining the latching relay switch 34 in circuit-closing position. A tripping relay 44 is effective when energized to trip or release the latch 42, thus permitting the latching relay 32 to move the switch 34 to the circuit-open position.

The tripping relay 44 is controlled by an electric circuit having an electronic tube 46 with an anode 48, a control grid 50, and a cathode 52.

The grid-to-cathode circuit of the electronic tube 46 includes heat-responsive means 54 and 56 having normally closed contacts 58 and 60, respectively, and heat-responsive means 62 and 64 arranged in parallel and having normally open contacts 66 and 68, respectively.

Though temperature-sensitive elements 54, 56, 62, and 64 are shown in the drawing, it is to be understood that these elements could be any electrical or mechanical means for sensing an electrical or mechanical parameter which can be converted to an electrical switch closure. Typical sensing elements include mercury thermometers, pressure switches, level switches, flow switches, timers, and gas analyzers.

Broadly, the control relay 10 with its switches 12 and 14 comprises a first switching means for controlling the flow of electric current to the temperature controller. The latching relay 32 with its switch 34 and the tripping relay 44 controlled by the flow of current through electronic tube 46 comprise a second switching means for controlling the first switching means. The temperature-sensing switches 54, 56, 62, and 64 comprise switching means responsive to a predetermined value of the temperature in the process and operate the latching relay 32.

In operation, the automatic limit control apparatus is installed between the power input to the various temperature controllers and the source of A.C. power such as 115 v. A.C. power. The sensing elements 54, 56, 62, and 64 are installed on the process to be monitored.

If the relays 10 and 32 are in the "tripped" position as indicated in the figure, no power is available at the power output. The circuit is activated by pressing the reset button 70 in line 72. The closing of the reset button 70 energizes the latching relay 32. The armature of the relay is moved upwardly causing latching relay switch 34 to engage contacts 36 and 38. The latching relay 32 will remain in this position even after power is removed from the solenoid 32 until the tripping relay 44 is energized, thereby releasing the latch 42 and allowing the armature of latching relay 32 to move to its alternate position.

Relay 10 is energized through the switch 34 of latching relay 32, causing the switches 12 and 14 of control relay 10 to engage switch contacts 18 and 22, respectively. Thereafter, A.C. power is supplied through lines 28 and 30 to the temperature controllers and to the primary winding 74 of the magnetic core transformer 76.

The secondary windings 78 and 80 of the transformer 76 provide 6.3 v. A.C. power for the heater 81 of the electronic tube 46 and 115 v. A.C. power to the plate circuit of tube 46. In addition, the heater supply voltage is rectified by rectifier 82 to provide a negative D.C. bias of say —8 volts for the grid 50 of electronic tube 46. This bias is sufficient to keep electronic tube 46 from conducting during the positive half cycles of the plate supply voltage.

If one of the monitored parameters reaches its preselected limit level, the switch associated with that sensing element opens, if it is a normally closed switch such as switches 54 and 56, or closes if it is a normally open switch such as switches 62 and 64. In either case, the negative bias signal is removed from the grid 50 of electronic tube 46 which permits the tube to conduct during the positive half cycles of the supply voltage. If either switch 54 or switch 56 is opened, the negative D.C. bias can no longer be applied to the grid 50. If, on the other hand, either switch 62 or switch 64 is closed, the control grid 50 will be grounded, thereby removing the negative bias.

The current which flows through electronic tube 46 energizes the tripping relay 44 causing the latching relay 32 to be moved to the tripped position as indicated in the drawing. When the latching relay 32 moves to the tripped position, control relay 10 is de-energized permitting the switches 12 and 14 to return to their positions as shown in the drawing. In this manner, 115 v. A.C. power is removed from lines 28 and 30 and from the primary winding 74 of transformer 76.

With the arrangement of the latching relay 32, the latching relay will only be operated to open switch 34 to remove power from the temperature controllers if the temperature-sensing devices sense a temperature which is outside of the predetermined limit. Hence, in the event of a line power failure, the switch 34 remains in contact with switch contacts 36 and 38 even though the switches 12 and 14 of relay 10 will open. When the line voltage is again supplied to the unit, the control relay 10 is again energized through the switch 34 of latching relay 32; and 115 v. A.C. power is again supplied to the temperature controllers.

I claim:

1. In combination with a source of electric power and a process controller: a control relay having switches in conducting lines leading to the process controller; a latching relay with a switch in a conducting line leading to the control relay; an electric circuit having an electronic tube with an anode, control grid, and a cathode, said electronic tube being biased to a nonconducting state to prevent the flow of current to a tripping relay in its anode-to-cathode circuit; and switch means in the grid-to-cathode circuit of the electronic tube and responsive to a predetermined value of a parameter in said process controller to decrease the bias on the electronic tube whereby the electronic tube conducts to operate the tripping relay to thereby trip the latching relay to open the latching relay switch to operate the control relay to stop the flow of current to the process controller.

2. A switching circuit adapted to be combined with a source of electric power and a process controller comprising: a first switching means for controlling the flow of electric current to the process controller; a second switching means for controlling the first switching means; and switch means responsive to a predetermined value of a parameter in said process for operating said second switching means, said second switching means including a latching relay with a switch in a conducting line leading to the first switching means, tripping means operated by the switch means responsive to the predetermined value of the parameter to trip the latching relay to stop the flow of current to the first switching means, and an electric circuit with an electronic tube having an anode, control grid, and a cathode, said electronic tube being biased to a nonconducting state; and said switch means responsive to the predetermined value of the parameter is in the grid-to-cathode circuit of the electronic tube and responsive to the predetermined value to remove the bias and cause the electronic tube to conduct to operate the tripping means.

3. In combination: a process controller; a source of electric power to the process controller; a first switching means for controlling the flow of electric current to the process controller; a second switching means for controlling the first switching means; and switch means responsive to a predetermined value of a parameter in said process is operating said second switching means, said second switching means including a latching relay with a switch in a conducting line leading to the first switching means, tripping means operated by the switch means responsive to the predetermined value of the parameter to trip the latching relay to stop the flow of current to the first switching means, and an electric circuit with an electronic tube having an anode, control grid, and a cathode, said electronic tube being biased to a nonconducting state, and the switch means responsive to the predetermined value of the parameter is in the grid-to-cathode circuit of the electronic tube and responsive to the predetermined value to remove the bias and cause the electronic tube to conduct to operate the tripping means.

References Cited by the Examiner
UNITED STATES PATENTS

| | | | |
|---|---|---|---|
| 2,128,802 | 8/1938 | Crary | 307—126 |
| 2,166,788 | 7/1939 | Amsden | 307—116 |
| 2,335,650 | 11/1943 | Cramer | 307—125 |
| 2,977,511 | 3/1961 | Reeder et al. | 317—13 |
| 3,032,690 | 5/1962 | Elliot | 317—13 |
| 3,064,161 | 11/1962 | Albertssen et al. | 317—13 |
| 3,064,162 | 11/1962 | Savell | 317—13 |

LLOYD McCOLLUM, *Primary Examiner.*